Figure 1:
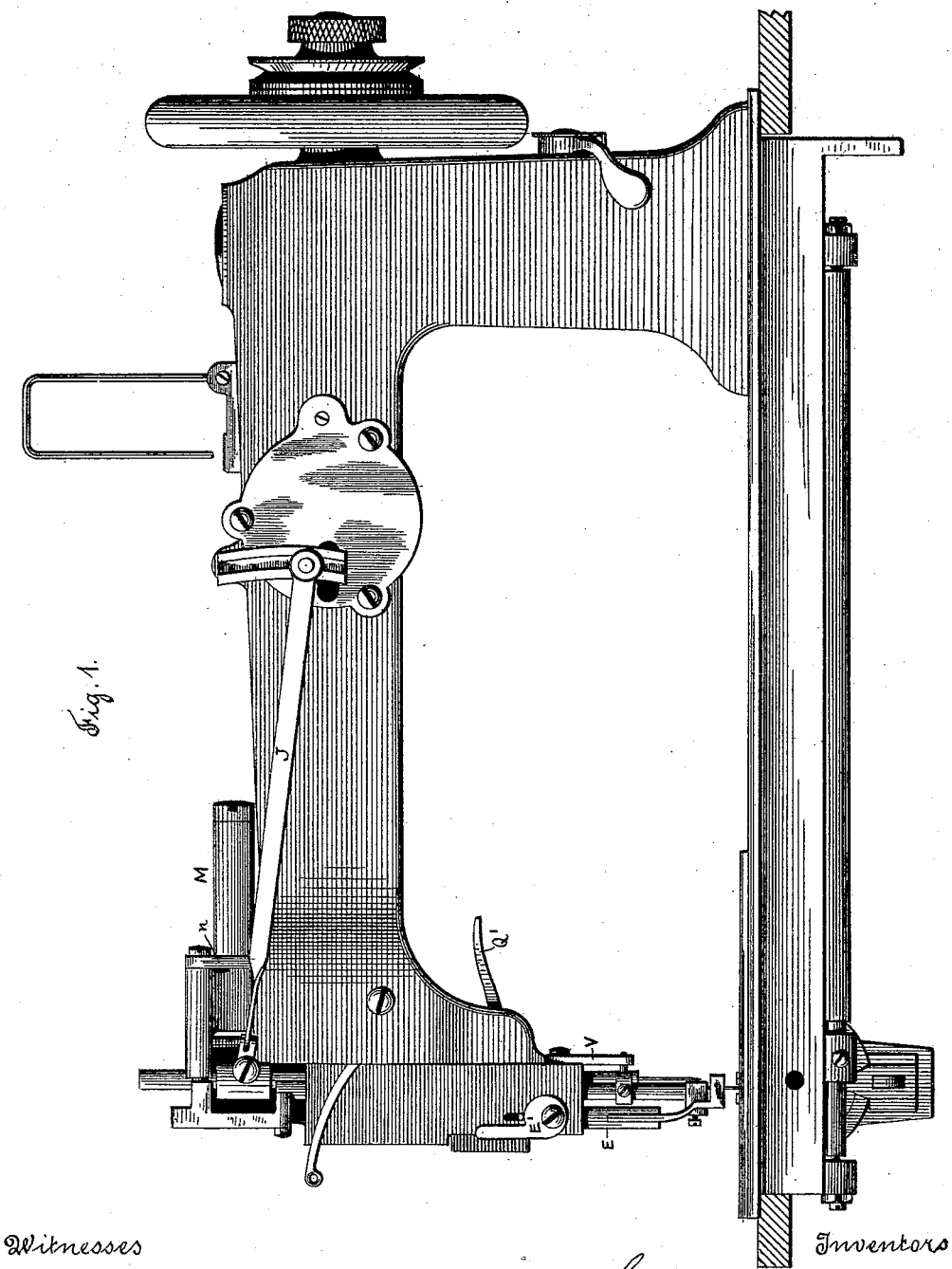

(No Model.) 7 Sheets—Sheet 1.

S. BORTON & C. H. WILLCOX.
MACHINE FOR TRIMMING AND SEWING FABRICS.

No. 498,616. Patented May 30, 1893.

Witnesses
Chas. F. Schmelz
R. L. Hogue.

Inventors
Stockton Borton & Chas. H. Willcox,
By their Attorneys
Pollok & Mauro (No Model.) 7 Sheets—Sheet 2.
S. BORTON & C. H. WILLCOX.
MACHINE FOR TRIMMING AND SEWING FABRICS.
No. 498,616. Patented May 30, 1893.
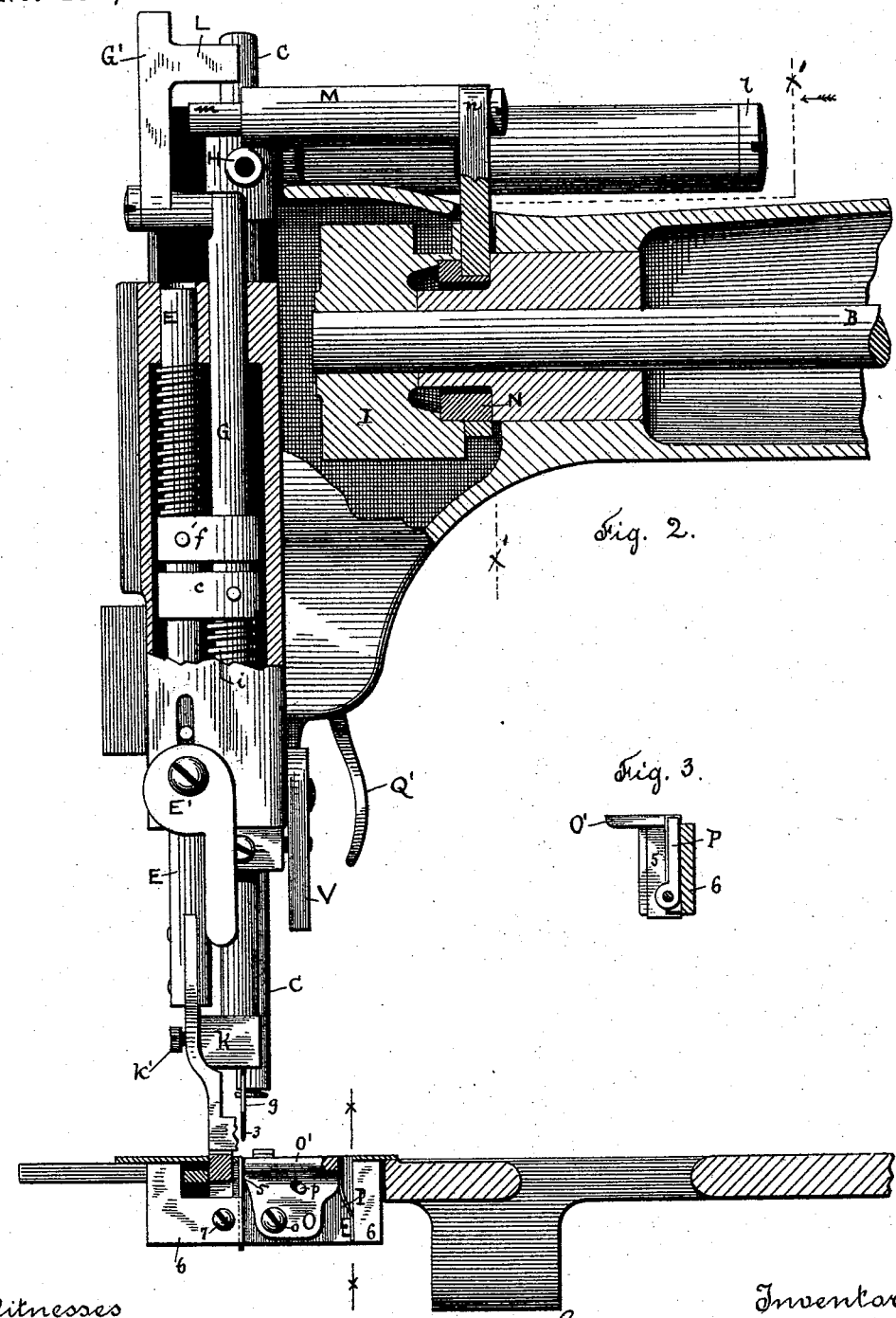

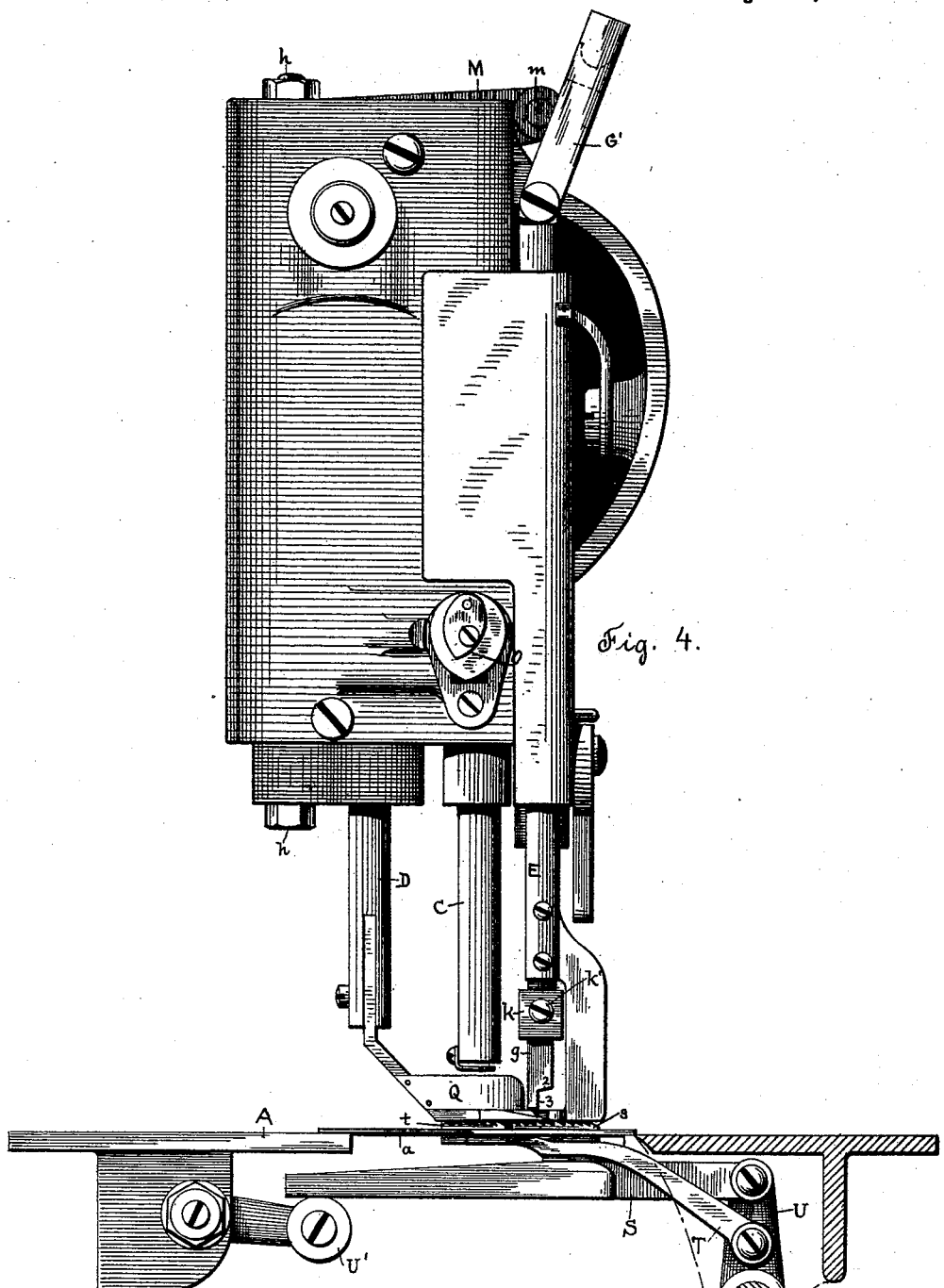

(No Model.) 7 Sheets—Sheet 4.

S. BORTON & C. H. WILLCOX.
MACHINE FOR TRIMMING AND SEWING FABRICS.

No. 498,616. Patented May 30, 1893.

Witnesses
Chas. F. Schmelz
R. L. Hogue

Inventors
Stockton Borton & Chas. H. Willcox
By their Attorneys
Pollok & Mauro

THE NORRIS PETERS CO., PHOTO-LITHO., WASHINGTON, D. C.

(No Model.) 7 Sheets—Sheet 5.
S. BORTON & C. H. WILLCOX.
MACHINE FOR TRIMMING AND SEWING FABRICS.
No. 498,616. Patented May 30, 1893.

Witnesses
Chas. F. Schmelz.
R. L. O'Hogue

Inventors
Stockton Borton & Chas. H. Willcox
By their Attorneys
Pollok & Mauro (No Model.) 7 Sheets—Sheet 6.
S. BORTON & C. H. WILLCOX.
MACHINE FOR TRIMMING AND SEWING FABRICS.
No. 498,616. Patented May 30, 1893.
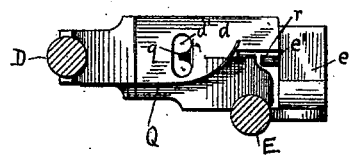
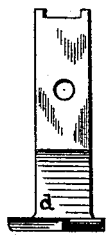
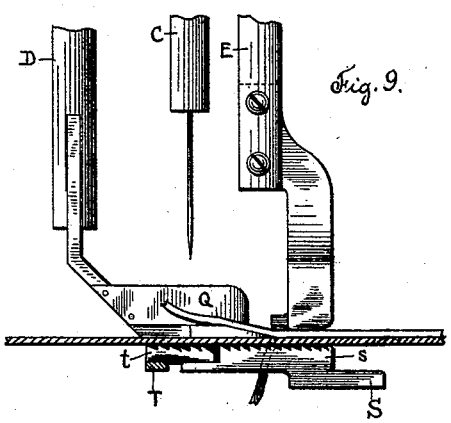
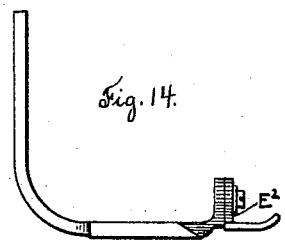
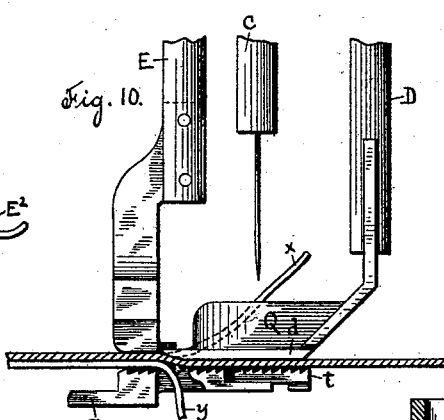
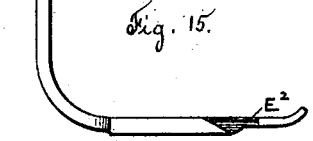
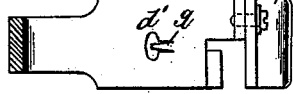
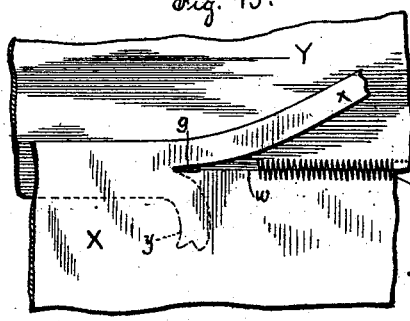
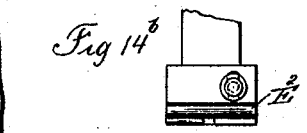
Witnesses
Chas. F. Schmelz
R. L. Hogue
Inventors
Stockton Borton and
Chas. H. Willcox
By their Attorneys
Pollard Mauro (No Model.) 7 Sheets—Sheet 7.
S. BORTON & C. H. WILLCOX.
MACHINE FOR TRIMMING AND SEWING FABRICS.
No. 498,616. Patented May 30, 1893.
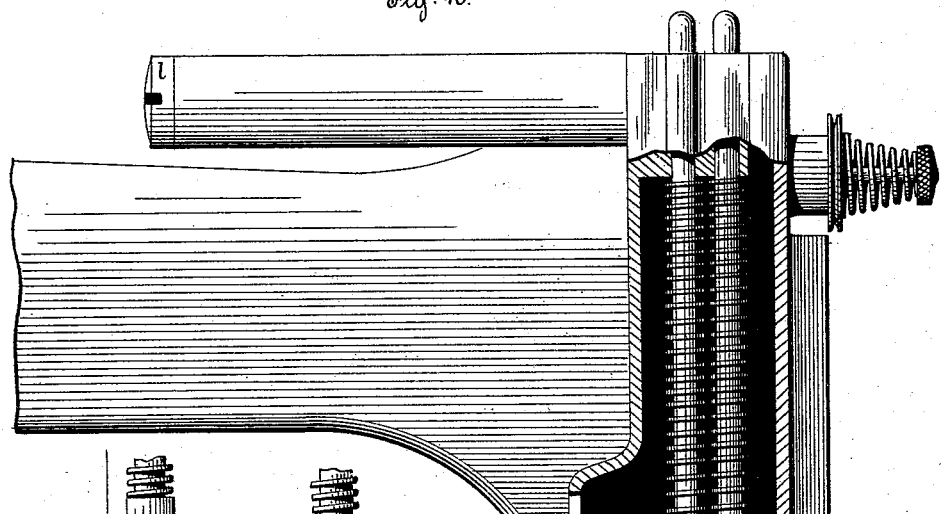
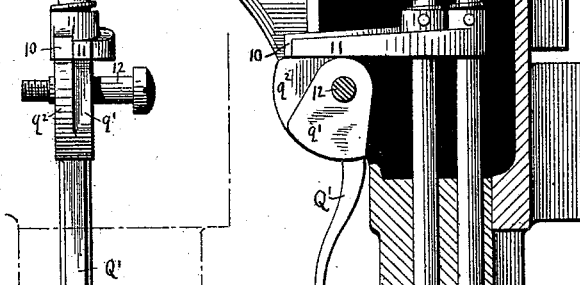
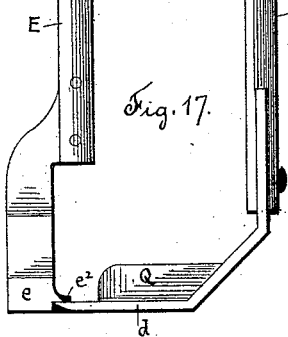
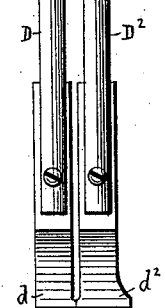
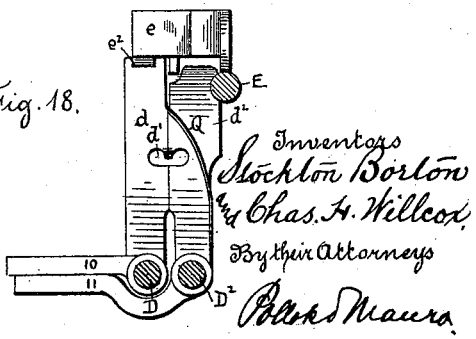
Witnesses
Chas. F. Schmelz
R. L. Hogue
Inventors
Stockton Borton
Chas. H. Willcox
By their Attorneys
Pollok & Mauro

UNITED STATES PATENT OFFICE.

STOCKTON BORTON, OF PROVIDENCE, RHODE ISLAND, AND CHARLES H. WILLCOX, OF NEW YORK, N. Y., ASSIGNORS TO THE WILLCOX & GIBBS SEWING MACHINE COMPANY, OF NEW YORK, N. Y.

MACHINE FOR TRIMMING AND SEWING FABRICS.

SPECIFICATION forming part of Letters Patent No. 498,616, dated May 30, 1893.

Application filed November 8, 1890. Serial No. 370,835. (No model.)

*To all whom it may concern:*

Be it known that we, STOCKTON BORTON, of Providence, in the county of Providence, State of Rhode Island, and CHARLES H. WILLCOX, of New York city, in the county and State of New York, have invented a new and useful Improvement in Apparatus for Trimming and Sewing Fabrics, which improvement is fully set forth in the following specification.

This invention relates to the art of uniting knit goods in the manufacture of hosiery and similar articles, though it is applicable to the sewing of other fabrics.

The object of the invention is to form a flat seam, that is to say, a seam wherein the proximate edges meet without overlapping, the edges being united by suitable stitches, as hereinafter described. This object has been heretofore sought in many ways, various devices and methods being resorted to, in order to overcome the difficulties experienced in uniting the edges of knit fabric, which difficulties are well understood by persons skilled in the art.

While for comfort of the wearer, it is of great importance that there should be no appreciable thickening of the garment at the seams, the formation of a flat, and at the same time of a strong seam, with cut knit goods, is rendered difficult by the want of stability of the fabric at the raw edge, and its very great tendency to curl up tightly, a tendency that renders the proper guiding and feeding of the goods to the needle an operation of extreme difficulty.

A zig-zag sewing machine, which forms a seam whose stitches cross back and forth over the meeting line, presents convenient means for uniting two pieces of fabric presented to the sewing mechanism with their edges abutting and in close juxtaposition, and attempts have heretofore been made to unite pieces of cut fabric by introducing them into a zigzag machine in this manner. The unsatisfactory result of such attempts is due to the difficulties above indicated, which present themselves in the effort to produce perfectly straight and even edges, and to guide them in juxtaposition into the machine. The success of such attempts is further impaired by the fact that such edges quickly ravel and become ragged, it being well understood that, to insure satisfactory results, the edges should be sewed immediately after being prepared by trimming. It has been heretofore proposed to prepare the fabric for the action of a zigzag sewing machine by laying the two pieces together so that their edges overlap a short distance, holding them on plates provided with projecting pins, and then, while the fabric is held stationary, cutting through the overlapping edges in the line of the proposed seam, thus leaving in juxtaposition the edges to be joined. In this position the fabric was to be fed into a sewing machine by advancing the plates, still holding the fabric on the pins thereof, to be united by sewing across the meeting line. In carrying out this plan it would be necessary to provide holding plates as long as the edges of the pieces to be joined, a very inconvenient and awkward arrangement, and one requiring considerable room for its operation. The plan also contemplated a long guide-rail upon which the holding plates could run into the machine. It would be necessary further to complete the trimming along the entire length of the pieces to be joined, and to remove in some way the trimmed off strips, apart from the sewing machine, before starting the plates into the latter, and also to devise special feeding devices for the holding plates, and a special construction of sewing machine to permit the sewing to be properly performed while the plates were passing through it. The operation of the latter would, of course, be necessarily interrupted at the completion of each separate operation, in order to remove the plates and the work, and to prepare and introduce the next set.

According to the present invention, the two pieces of fabric are arranged to be sewed together by slightly overlapping the rough edges, as in the plan just referred to. In that position they are introduced under the presser foot of a zig-zag or other sewing machine suitable for the purpose, the machine being provided with a trimming blade or cutter working just in advance of the stitch forming mechanism. The trimmer cuts through both layers of fabric, cutting off a strip from each, the strips being on opposite sides of the line of cutting. The cut edges of the two pieces of fabric come into juxtaposition, being held together under the presser foot, and are immediately united by means of stitches connected by threads which cross back and forth over the meeting line. The detached strips are diverted from the path of the needle or needles so as not to be caught in the seam, one strip passing beneath the throat plate through an opening therein, and the other being carried over the presser foot. The operations of feeding, trimming, diverting the cut off strips, and uniting the abutting edges by suitable stitches thus proceed simultaneously, the only care required on the part of the operator being to see that the two pieces of goods are overlapped and properly started into the machine.

The stitches by which the abutting edges of the fabric are held together may be produced in a variety of ways, differing in respect of the formation of the seam, the number of threads employed, the manner in which they are interlaced, and the mechanism by which the stitching is performed. In all cases, however, it is necessary that the stitches or needle punctures be on both sides of the line of seam, and be connected by a cross-thread or cross-threads, and the machine used must have an oscillating thread-carrying device for carrying the cross-thread or cross-threads over the line of seam. In the case of a zig-zag machine, whether single or double thread, this oscillating thread-carrying device is the needle itself, which is either carried by an oscillating frame, or is pivoted so as to swing back and forth like a pendulum. In other machines making a back and forth or cross-stitch, this oscillating thread carrier would be a looper or similar device, either carrying a thread of its own to interlace with the threads on opposite sides of the line of seam, or acting upon the thread of one of the needles to carry a loop thereof into the path of another needle. The invention therefore contemplates the use of any machine making what may be conveniently termed a cross-stitch, of which there are several types besides the well known zig-zag seam. For example, we may use a machine in which two needles, carried by one needle-bar working in fixed guides, puncture the fabric on opposite sides of a given line (which when used for the purpose of this invention would be the meeting line of the cut edges) and co-operate with suitable loopers to carry the thread of one needle across such line into the path of the other needle as it descends. Or the cut edges may be united by means of two needles, each carrying a thread and each making a chain stitch, co-operating with two thread carriers, one above and one below the material, each carrying a thread back and forth across the line of seam to be interlaced with the two lines of chain stitching; or the stitch may be formed by two needles, carrying each a thread, interlaced below the material with a bobbin thread which passes through the loops of both needle threads and above the material with a thread zig-zagged across the line of seam by a thread carrier, and interlacing with both the upper threads. In both these last described plans four threads are employed. Any of these plans would have a certain advantage over the ordinary zig-zag machine, in that greater speed is thereby attainable; inasmuch as in them a complete stitch across the line of seam is made at each reciprocation of the needle bar, to accomplish which, in the ordinary zig-zag machine, requires two reciprocations and one oscillation of the needle-bar.

In practically carrying out this invention we have found it necessary, in order to secure the best results, to modify in certain respects, as will be fully described, the construction of those parts of the sewing machine by which the goods are trimmed before sewing, and by which they are held, guided, and fed during the trimming and sewing operations. The trimming blade is arranged in front of the stitch-forming mechanism, and its cutting edge is in a vertical plane which intersects the path of motion of the needle or other oscillating thread-carrying device. Heretofore, in a combined sewing and trimming mechanism, the cutting edge of the trimmer, whether in advance of, or behind the needle or needles, has always been to one side or the other of the extreme limit to which the thread is carried in forming the stitches.

In trimming and sewing according to this invention, the presser foot, or means for holding the work during the trimming and sewing, has beneath it different thicknesses of fabric at different points. That is to say, in front of the trimmer, where the edges overlap, there are two layers of fabric to be held. Behind the trimmer, or after the cut off strips have been diverted from the line of action of the trimming and sewing mechanism, there is but one thickness of fabric beneath the foot. To meet these conditions it is necessary that the bearing surface behind the trimmer should be lower down, or closer to the throat plate, than the bearing surface which acts in front of the trimmer, and that the difference in elevation between the two surfaces should equal approximately the thickness of the fabric. In order that the machine may operate on fabrics of different thickness, the front bearing surface should be made adjustable with reference to the main portion of the presser foot, and it may be attached thereto by an adjustable connection, or it may be entirely independent thereof. This latter form is preferred, the machine being provided with two presser-feet, one holding the work in front of the trimmer, and the other acting in the rear thereof. The function of the rear presser-foot is to press what was originally the upper layer fabric down into the plane of the lower layer, and to hold both pieces with their edges in close juxtaposition while the stitching takes place. As customary in machines making a zig-zag stitch, the needle hole in the presser foot is an oblong transverse slot, but in order to prevent the edges from being lifted up out of their normal plane by the pulling up of the thread, there is a projection or toe at the middle of the slot, giving to the latter the shape of the letter B. The needle in its oscillating movement passes back and forth over this projection.

In the manufacture of hosiery it often becomes necessary to join together two pieces of fabric of different thicknesses, as in sewing the ribbed band to the lower edge of shirts, or the cuffs to the sleeves, and when such pieces are fed into the machine with their edges abutting, the presser foot acting behind the trimmer, has beneath it on one side of the line of seam a greater thickness of fabric than on the other side. For sewing work of this kind, it is desirable that the presser foot should be able to accommodate itself to these conditions. To this end the back presser foot is divided longitudinally into two parts, making in effect two presser feet which, though they can be raised by means of the same lifting lever are so far independent of each other that they can bear with proper pressure upon two pieces of goods differing in thickness. This construction has another advantage in facilitating the introduction of the work into the machine. It will be understood that the surplus margin of the upper layer of fabric must, after being detached by the trimmer, pass over the rear presser-foot, while the main portion thereof, passes under it. To start it properly requires that the edge be bent upward and brought over that part of the presser foot which is on the other side of the cutter from the main portion of the piece. By making two presser feet, as just indicated, that foot which is to lie beneath the trimmed off edge can be first brought down upon the lower piece of fabric, and then when the edge of the upper piece is properly started over it, the other foot can be lowered upon the main portion of the upper piece. That part of the rear presser-foot which lies beneath the trimmed-off edge is inclined upward toward the rear, and is provided with a curved guide which carries the detached strip away from the path of the needle or needles. When the back presser-foot is divided into two parts separately supported, the front presser-foot may be connected with one of these parts in such manner as to be raised and lowered with it, or it may be made integral with or adjustable on it. The presser-feet can be carried on levers pivoted to the frame of the machine, or on bars working through guides in the head thereof. The surplus margin of the lower piece of fabric is guided through the throat plate, and to start this operation the corner of the piece is turned down into an oblique opening adjacent to the cutting blades. In this opening is provided a plate with which is combined a spring tending to press it against the upper blade, to keep it in action against the lower blade. The plate may be pivoted or arranged to slide, and for the purpose of keeping the blades together the spring might be arranged to act directly against the blade. The plate referred to preferably has a horizontal triangular flange, which is flush with the throat plate, and constitutes a shelf upon which the upper piece of goods rests, while the oblique edge of this flange forms one side of the opening through which the lower detached strip passes. The oblique opening may, of course, be formed entirely by the throat plate. The trimmer bar (or it may be a lever) carrying the upper blade is moved upward by a spring, and receives a positive motion downward by suitable means, the actuating mechanism being detachable at will, so that when disengaged the trimmer will be held up out of action by its spring. Throwing the trimmer out of action becomes necessary in sewing around a circle, the edge of a cuff for example, to prevent the trimmer from cutting the stitches where the seam was begun. Means are also provided for locking the upper or movable blade in its lowest position, when edges are being sewed that do not overlap or require to be trimmed. In this position the blade acts simply as a guide for the edges which pass on opposite sides of it.

The invention includes the new improvements indicated above, together with certain special arrangements and combinations of parts, as hereinafter set forth.

The accompanying drawings which form part of this specification, illustrate a Wheeler Wilson zig-zag stitch machine, modified in in accordance with the invention. The particular construction of parts shown in the drawings is, of course, such as found most advantageous in adapting this particular type of machine to the purposes of the invention; and it will be understood that details are susceptible of modification, and that changes of this sort would be necessary in applying the invention to other kinds of machines.

Figure 5:
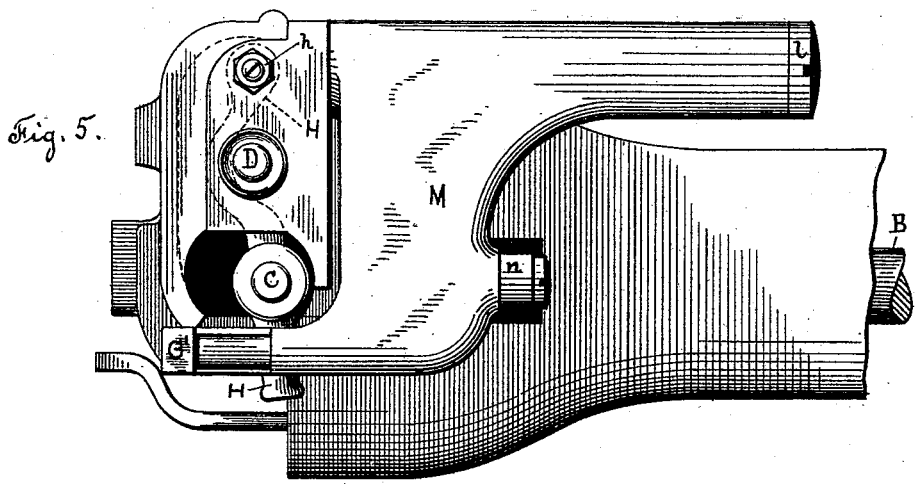
Figure 6:
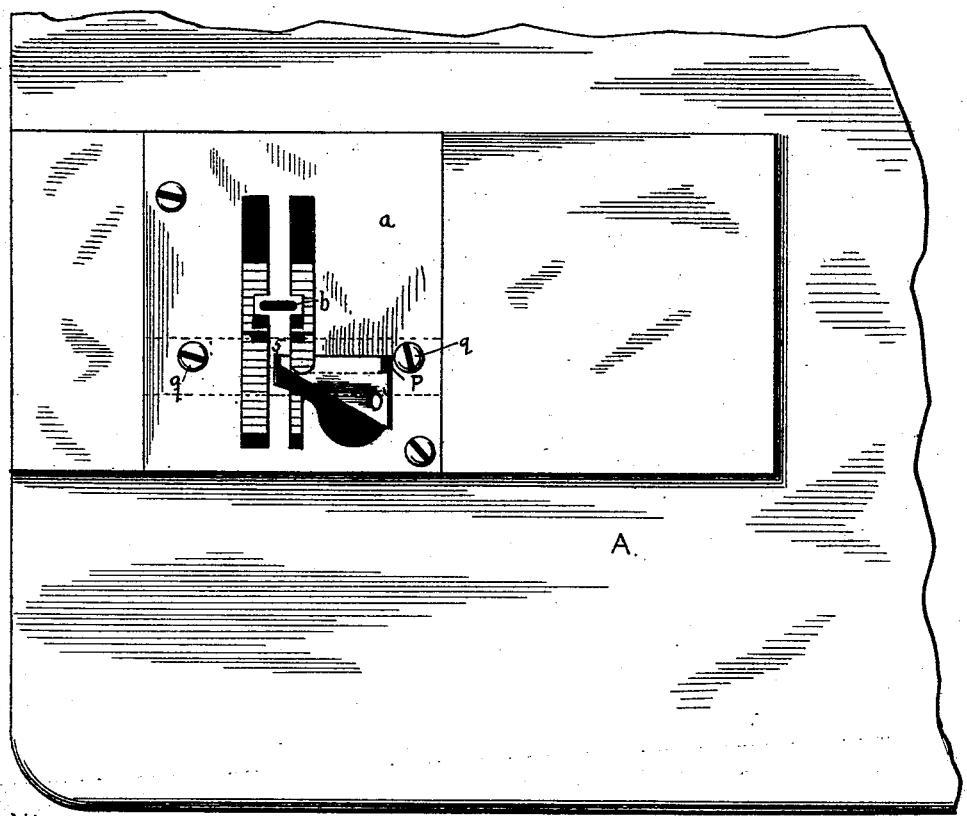
Figure 7:
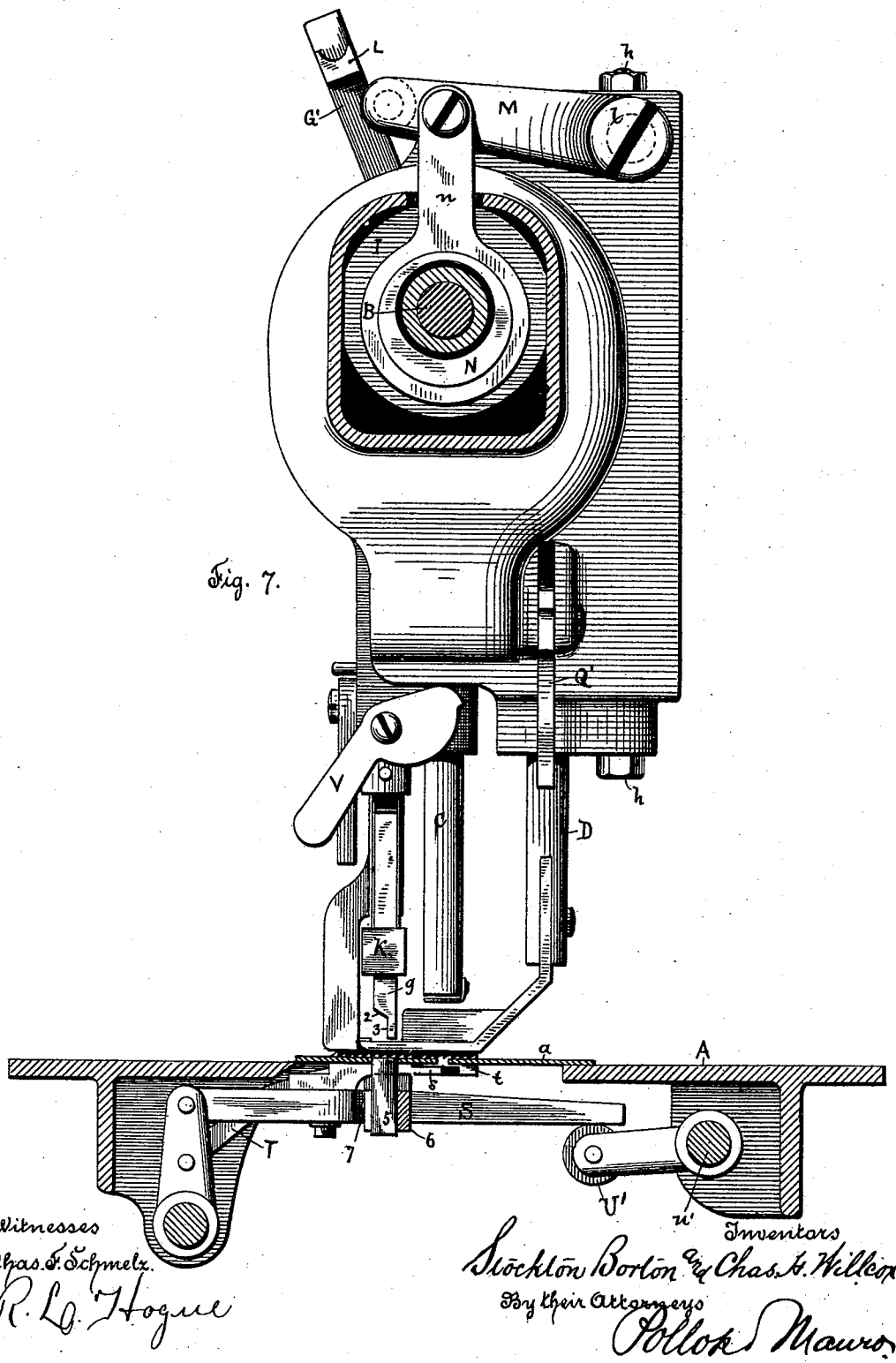

Figure 1 is a front elevation of the machine; Fig. 2 an enlarged front view of the head partly in section; Fig. 3 a section of lower blade holder on line $x-x$, Fig. 2; Fig. 4 an end view; Fig. 5 a top view of the head; Fig. 6 a plan view of the throat plate; Fig. 7 a vertical section on line $x'-x'$ Fig. 2 in elevation looking to the left. Fig. 8 is a plan view of presser feet; Figs. 9 and 10 elevations thereof on left and right sides respectively; Fig. 11 a front view of the rear foot (the guide being omitted); Fig. 12 a rear view of the front foot; Fig. 13 a plan view illustrating the trimming and stitching of two pieces of goods; Figs. 14 and 15, side views showing modifications of the presser-feet. Fig. 14$^a$ is a top plan view, and Fig. 14$^b$ a front view of the foot shown in Fig. 14; Fig. 16 a rear elevation partly in section showing two back presser-feet, and Figs. 17 and 18 respectively side and plan views of the same.

A represents the cloth plate or bed of the machine, and a the throat plate.

B is the main shaft, C the needle bar, D the rear foot-bar corresponding with the ordinary foot-bar of the machine, E the front foot-bar, and G the trimmer-bar carrying the upper or movable shear-blade g.

For the sake of showing with greater clearness the improvements or novel parts, we have omitted from the drawings certain features of the machine, such as the revolving hook or shuttle, whose construction and operation are well understood.

The needle-bar C is carried, as usual in this type of machine, by an oscillating frame H pivoted at h in the head of the machine (Figs. 4 and 5) and is reciprocated vertically in bearings of said frame by a crank connection (not shown) actuated from a cam I (Fig. 2). The frame H is oscillated across the line of seam between each descent of the needle, by a link J (Fig. 1), which is adjustable to increase or diminish the distance between the needle punctures. These parts are of the usual construction and need no full description.

The cutting blade g works through an opening in the cloth plate a short distance in front of the needle (see Fig. 6) the cutting edge being in line with the center of the needle slot b. The trimmer-bar G works in bearings in the head of the machine, and receives its upward motion from a coiled spring i (Fig. 2). At its upper end is a pivoted arm G', which has a projection L grooved on its upper side as shown in Fig. 7. This projection is normally in contact with a pin m on a rocking lever M, in the form of a broad plate. The oscillation of lever M imparts the downward motion to the trimmer-bar. Lever M is pivoted on a stud l (see Fig. 5) and receives its oscillating motion from an eccentric N on the main shaft, through a connection-rod n. (Fig. 7.) When it is desired to throw the trimmer out of action, the arm G' can be disengaged from pin m and turned to one side, as in Figs. 4 and 7, when the trimmer bar will be upheld by its spring i.

Trimmer-bar G has a cross-bar c secured thereto (see Fig. 2) at one end, and provided with a hole (or a slot) through which the front foot-bar E passes loosely. Spring i bears at the upper end against this cross-bar. Foot-bar E has a similar cross-bar f which loosely surrounds the trimmer-bar G. By these devices the two bars are prevented from turning in their bearings. The cutting blade g is a flat strip of metal and is held in a groove of the bar G by a strap or clamp k and set screw k'. (Figs. 2 and 7.)

The cutting edge 2 is inclined and beveled to make a shear cut. The blade has a downward projection 3 beyond the cutting edge, and this projection is normally in contact with the lower blade. As shown in Fig. 7, however, the trimmer being disengaged from its actuating mechanism, the lower extremity of blade g is above the throat plate, so that the work can pass freely under it.

The lower blade 5 is supported beneath the throat-plate in a holder 6, secured to the plate by means of screws 9 (Fig. 6). The blade is set in a groove in the holder, and clamped therein by screw 7, the holder being slit to form clamping jaws having the required amount of elasticity. (See Figs. 2 and 7.) The upper end of blade 5 extends to the upper surface of the throat plate, being set in the end of an oblique opening through said plate (Fig. 6). Beneath this opening and in a recess in the holder 6 is a plate O, pivoted to said holder at o (Fig. 2) and pressed toward the blade 5 by a spring P. A pin p limits the play of the plate in this direction, so that there is always clear space between it and the blade 5. In the normal operation of the machine, plate O bears against the extremity 3 of the upper blade g, thus tending to keep the cutting edges of the two blades in good working contact. When, however, the upper blade is lifted entirely away from blade 5, by throwing the trimmer out of action, the pin p holds plate O back far enough to leave a space into which the beveled end 3 of the blade g can reinsert itself, when the trimmer is again brought into action.

The opening in the throat-plate a, extending obliquely from the cutters, is provided for the passage of a strip trimmed from the lower piece of fabric. Its oblique front edge permits the turning down of the corner of this piece when the latter is introduced into the machine under the presser-foot, and with its forward edge against the projection 3 of blade g. This opening is partly occupied by the horizontal flange O' of plate O, which flange is flush with the throat-plate, and forms a rest or support for the upper piece of goods, and also acts as a guide for the lower detached strip, and a separator between it and the overlying piece of fabric. Obviously it is not necessary that the guide and separator O' should be carried by the plate which holds the trimming blades in contact.

The rear presser-foot d (Figs. 8 to 11) has an oblong transverse slot d' for the passage of the needle. From the front edge of this slot projects a toe q which bears directly upon the two edges of the fabric at their meeting line. In the forward part of the presser-foot is a slot r through which the trimmer-blade g passes. The upper surface of the foot on one side (lower side Fig. 8) is inclined upward, and is provided with a curved guide Q for diverting the upper detached strip around the needle slot. The inner corner of this part is rounded to facilitate the introduction of the work. Bar D may be raised when required, by the lifting lever Q'.

The front presser-foot e is arranged to bear on the overlapped part of the work in front of the trimmer. Being independently supported by its bar E, and provided with its lifting lever E', it can be raised and lowered independently, and will exert proper pressure upon the additional thickness of fabric which lies beneath it. For the purpose of keeping pressure on the edge of the fabric adjacent to the cutting blade at the point where the cutting takes place, the foot $e$ is provided with a rearwardly projecting toe $e'$ (Figs. 8 and 12) extending into the space between the two branches of the rear foot $d$.

Though preferable, it is not necessary, that two presser-feet be used. Figs. $14^a$ and $14^b$ shows a presser-foot whose forward part $E^2$, which has a slot for the trimmer blade, has its bearing surface in a higher plane than that of the main portion of the foot, and is adjustably secured thereto by means of a clamp screw. In Fig. 15, the front portion, otherwise similar to the construction of Fig. 14, is integral with the main portion of the foot. The pressure on the work behind the cutting blades may be exerted by two presser-feet on opposite sides of the line of cutting. This construction is shown in Figs. 16 to 18, in which the two back presser-feet $d$ $d^2$ are supported independently, on presser-bars D $D^2$. These bars are provided with arms 10, 11 to receive the action of the lifting cams $q'$ $q^2$, which are on a common pivot-pin 12, and are in one piece with, and actuated by, the lifting lever $Q'$. The relative shape of cams $q'$ $q^2$ is such that, on lifting the lever $Q'$, the right foot $d$ looking from the front (the left in Fig. 16) rises first, and is lifted to its full height before foot $d^2$ begins to rise. In reversing the lever, foot $d^2$, the last to rise, is the first to descend. In starting the work, this construction permits the edge of the upper layer of goods to be brought over the foot $d^2$ before the foot $d$ descends upon it. The arms 10, 11, pass through an opening in the frame, the edges of which opening confine the arms and prevent the turning of the bars D $D^2$.

The front presser-foot $e$ is constructed as hereinbefore described, except that it has a small projection $e^2$, which overlies the front edge of the foot $d$. Consequently when the back foot $d$ is raised, the front foot is carried with it. Thus all the presser-feet may be raised by the lifting lever $Q'$. The toe $e^2$, however, does not prevent the front foot from accommodating itself to different thicknesses of work, or from being raised independently by its own lifting lever, whenever desired.

The feed of the work is effected by two feed-surfaces $s$ and $t$, carried respectively by the feed-bars S and T. Feed surface $s$ acts on the work in front of the needle, and feed surface $t$ acts in the rear thereof. Both feed-bars receive their horizontal movement from the rockshaft $u$, being pivoted at their ends to the feed-rocker U, carried by said shaft. Feed-bar S is elongated, and its end rests upon a roller U' carried by an arm of rock-shaft $u'$, which gives to said feed-bar its up and down motion. Feed surface $t$ rests and slides upon an underlying part of feed-surface S, as shown in Figs. 9 and 10, and consequently rises and falls with the latter.

Bar S is attached to feed-rocker U at the extremity thereof, while bar T is attached thereto at an intermediate point, approximately half-way between its center and extremity. Consequently the feed-surface $s$ has a movement horizontally about twice as long as that of surface $t$, the object being to crowd the work toward the needle faster than it is fed away from the same. This feed action prevents the fabric from being stretched or elongated at the seams by the wedging action of the needle, which, particularly in sewing knit goods with zig-zag and similar stitches, takes place to an extent very detrimental to the appearance and shape of the garment, unless counteracted in the manner indicated.

We do not herein claim broadly the use of a differential-acting feed in connection with mechanism for sewing knit fabrics, a feed movement similar in principle having been described and claimed in our application, Serial No. 353,091, filed May 24, 1890.

Fig. 13 illustrates the formation of the seam, X and Y being respectively the upper and lower pieces of fabric, $x$ and $y$ the detached strips, and $z$ the line of zig-zag stitching. In starting the work into the machine, the piece Y lies to the left of the operator, and the piece X to his right, under the gooseneck of the machine, its edge overlapping that of piece Y for a suitable distance. Piece Y is introduced under the front foot $e$, and under the back foot $d$, and the corner of the edge to be trimmed off is turned down into the oblique opening in the cloth plate. Piece X overlies it, its forward edge resting upon the flange O', which acts as a separator, and as a guide for strip $y$. The surplus edge or margin of the upper piece X is carried over the corner of the left hand part of the back foot $d$ which, as shown in Fig. 8, is rounded for this purpose. The main portion of this piece X is under the other or right hand part of the foot; or if there be two back feet, as in Fig. 18, the foot $d^2$ can be dropped upon piece Y by a partial turn of lever $Q'$, in order that the edge of piece X may be easily carried over it, the foot $d$ (and with it foot $e$) being then lowered upon the work, which will now be properly disposed for starting the machine. The blade $g$ cuts through both layers of fabric in the line $w$ (Fig. 13) which line intersects the line of movement of the part or device (in this case the needle) which carries the thread back and forth across the line of seam. Heretofore, in sewing machines having trimmers working in advance of the needle, the line of cutting has been to one side or the other of the plane of the needle's movement. The detached strip $y$ passes beneath the cloth plate, and strip $x$ is guided away from the needle by the curved guide Q on foot $d$ or $d^2$. (Figs. 9, 10 and 18.)

In some parts of garments, as in sewing together the selvage edges of the cuff portion of a shirt, the edges are merely to be brought together, without being trimmed. In such case it is necessary that the trimmer be thrown out of action, and also that the work be guided so that the edges will meet at the exact line of seam. When this condition presents itself, the blade *g* may be forced down by means of the cam lever V (Fig. 7) which brings and holds its cutting edge 2 beneath the work plate. In this position, the blade is stationary, the projection L at the upper end of the trimmer-bar being too low to be struck by pin *m*. In this position the shank of the blade performs the necessary guiding action. Being just in advance of the needle, and in the direct line of seam, it causes the two edges to meet in that line without permitting them to overlap, and insures the proper placing of the stitches.

Obviously the use of the blade *g* to perform the function of a guide, is a matter of convenience, and conduces to simplicity; but the guiding could be performed by a separate part.

From the foregoing description, and from consideration of the general nature and objects of the invention, it will be understood that many modifications in matters of detail and arrangement could be made, without departing from the principle and spirit of the said invention. Such matters of construction will, to some extent, be controlled by the form of machine that may be selected for carrying out the invention.

The new improvements hereinbefore described, are shown as applied to a machine adapted for flat work. It will be understood, however, that in order to sew work in tubular form, as the sleeve of a garment for example, it would be necessary to use a "cylinder" or "arm" machine, so-called. The described improvements can be readily applied to a machine of this type by persons skilled in the art.

Having now fully described the principle of our said invention and the best means which we have contemplated for carrying the same into effect, what we claim, and desire to secure by Letters Patent, is—

1. In a sewing machine, the combination with mechanism for making a cross-stitch, including a device for carrying the thread back and forth with respect to the direction of the feed, of a trimmer working in advance of the stitch-forming mechanism, and having its cutting edge in a plane which intersects the path of oscillation of the device which carries the thread back and forth, so that stitches are placed on opposite sides of the line of cutting, and connected together and mechanism connecting and operating the trimmer and thread carrier, substantially as described.

2. In a sewing machine, the combination with stitch-forming mechanism including means for carrying a thread back and forth across the line of seam, of a trimming device working just in advance of the stitch-forming mechanism, and having its cutting edge or edges in a plane which intersects the path of oscillation of the thread-carrying device, a feed for advancing the work to the trimmer and stitch-forming mechanism, and a presser-foot for holding the work while being trimmed and sewed, substantially as described.

3. In a sewing machine, the combination with stitch-forming mechanism such as specified, and with work-holding and feeding devices, of a trimmer in advance of the stitch-forming mechanism, two guides for diverting the detached strips out of the path of the needle, said guides being respectively on opposite sides of the line of seam, substantially as described.

4. The combination with stitch-forming mechanism, such as specified, including an oscillating thread-carrying device, and with work-holding and feeding mechanism, of a trimmer acting in advance of the path of oscillation of said thread-carrying device, and guides, one on each side of the line of cutting, for diverting the detached strips, one of said guides being at the edge of an opening in the throat plate, permitting the strip on that side to pass beneath the same, substantially as described.

5. The combination with zig-zag or other analogous stitch-forming mechanism, of a trimmer acting in front of the stitch-forming mechanism, a presser-foot for holding the work during the trimming and sewing, a guide on the upper side of the said presser-foot for diverting a detached strip out of the way of the stitch-forming mechanism, and a second strip-guide on the opposite side of the line of cut from the first named guide, the throat-plate being provided with an opening on that side to receive the detached strip, substantially as described.

6. In a sewing machine, the combination with the stitch-forming mechanism, and with trimming mechanism in advance thereof, of work-holding devices, such as a presser-foot or presser-feet, having the bearing-surface in front of the trimmer at a higher level than the bearing-surface in the rear thereof, substantially as described.

7. In a sewing machine, and in combination with trimming mechanism in advance of the needle, a presser foot having two bearing parts for holding the work in front of and behind the trimming mechanism, the forward bearing part being adjustable with reference to the rear part, substantially as described.

8. The combination with the trimmer, of two independently supported presser-feet acting, the one in front of, and the other behind, the cutting edge of the trimmer, substantially as described.

9. The combination with the trimmer, and with stitch-forming mechanism, of a front presser-foot, and a rear presser-foot in close proximity thereto, the rear foot having two parts or members with a space between for the passage of the cutting-blade and of one of the strips detached thereby from the fabric, substantially as described.

10. In a sewing machine, the combination with the stitch-forming mechanism, of a presser-foot in two parts, disposed respectively on opposite sides of the line of seam, the two parts being independently supported, so that they can act on work of different thickness, substantially as described.

11. In a sewing machine, two independently supported presser-feet arranged to hold the work on opposite sides of the line of sewing, and combined with a common lifting lever for raising the feet successively, substantially as described.

12. In a sewing machine, the combination with the stitch-forming mechanism, of work-holding devices, comprising a front foot and two back feet, all independently supported, substantially as described.

13. The combination with stitch-forming mechanism for making a cross-stitch, and with a trimming device in advance of the same, of two presser-feet behind the trimmer, and a front foot independently supported, and having a projection overlying the edge of one of the back feet, substantially as described.

14. In a sewing machine trimmer, the combination of a stationary blade, a co-operating movable blade, a bar or support therefor, a spring for moving it away from the stationary blade, a pivoted arm connected with said bar or support and movable into and out of the path of a reciprocating device or pin, for the purpose of throwing the trimmer into and out of action, substantially as described.

15. The combination with the stitch-forming mechanism, of a trimming mechanism working in advance thereof and comprising a stationary blade supported beneath the work-plate in front of the needle, a movable blade carried above the work-plate and detachably connected with actuating mechanism for imparting a positive downward motion thereto, a spring for returning the movable blade, and means, such as a cam and lever, for locking the movable blade with its cutting edge beneath the work-plate, substantially as described.

16. The combination of the lower stationary blade, the upper movable blade, working in a hole in the throat plate adjacent to the lower blade, and a spring-actuated plate for holding the blades in working contact, said plate being pivoted beneath the throat plate and having a horizontal flange flush therewith and occupying part of said opening, so as to act as a support for the upper piece of goods, and as a guide to deflect the strip cut off the lower piece, substantially as described.

17. The combination with the throat-plate, and the stitch-forming mechanism, of the trimmer acting in advance thereof in an opening in the throat-plate, said opening extending obliquely from the trimmer blades, substantially as and for the purpose set forth.

18. In a sewing machine, the combination of the mechanism for making a cross-stitch, the trimmer acting in front of the same, the presser-foot, and the feed devices arranged to feed a piece of fabric on each side of the line of cut, said feed movement comprising two independent feed surfaces, and actuating mechanism for imparting to the surface in front of the needle a longer or faster movement than that imparted to the feed surface behind the needle, substantially as described.

19. The combination with the stitch-forming mechanism, of a stationary trimmer-blade supported beneath the work-plate, a movable co-operating blade having a projection that extends beneath said plate and is always in contact with the stationary blade when the trimmer is in operation, and a spring for pressing the said projection against the stationary blade, substantially as described.

In testimony whereof we have signed this specification in the presence of two subscribing witnesses.

STOCKTON BORTON.
                CHAS. H. WILLCOX.

Witnesses:
  FRED. E. TALBOT,
  GILMAN E. JOPP.